United States Patent
Eisberg et al.

[11] Patent Number: 6,074,595
[45] Date of Patent: Jun. 13, 2000

[54] METHOD OF MAKING PRESSURE VESSELS

[75] Inventors: Douglas Eisberg; Terry Gilbertson, both of Escondido; Christian Gargiulo, Vista, all of Calif.

[73] Assignee: Codeline Corporation, Chardon, Ohio

[21] Appl. No.: 09/173,842

[22] Filed: Oct. 16, 1998

[51] Int. Cl.⁷ ................................................ B29C 35/08
[52] U.S. Cl. ................. 264/496; 264/36.16; 264/40.1; 264/137; 156/64; 156/169; 156/172; 156/173; 156/175; 156/273.3
[58] Field of Search ..................................... 156/169, 172, 156/173, 175, 273.3, 273.5, 64; 264/36.16, 258, 40.1, 137, 496

[56] References Cited

U.S. PATENT DOCUMENTS

| | | | |
|---|---|---|---|
| H219 | 2/1987 | Sayles | 156/169 |
| 3,922,426 | 11/1975 | Feltzin | 428/295 |
| 4,892,764 | 1/1990 | Drain et al. | 428/34.5 |
| 4,917,756 | 4/1990 | Cahuzac et al. | 156/429 |
| 5,266,139 | 11/1993 | Yokota et al. | 156/169 |
| 5,273,603 | 12/1993 | Park et al. | 156/175 |
| 5,305,601 | 4/1994 | Drain et al. | 60/255 |
| 5,539,012 | 7/1996 | Klemarczyk et al. | 522/13 |
| 5,545,278 | 8/1996 | Chen et al. | 156/175 |
| 5,558,735 | 9/1996 | Rettew et al. | 156/275.5 |
| 5,565,499 | 10/1996 | Klemarczyk et al. | 522/13 |
| 5,585,414 | 12/1996 | Klemarczyk et al. | 522/13 |
| 5,679,719 | 10/1997 | Klemarczyk et al. | 522/13 |
| 5,772,938 | 6/1998 | Sharp | 264/137 |

*Primary Examiner*—Jan H. Silbaugh
*Assistant Examiner*—Stefan Staicovici
*Attorney, Agent, or Firm*—Fitch, Even, Tabin & Flannery

[57] ABSTRACT

Methods for making tubular pressure vessels from polymer-impregnated fibrous material utilize cylindrical mandrels that are helically wound while rotating about a horizontal axis. After end closure fittings are installed on the mandrel, a barrier layer having a thickness of about 0.015 in is created by helically winding a strip of nonwoven polyester fiber material which is impregnated and coated with a mixture of two resin systems, one which is promptly cured by UV radiation while the other remains uncured. The resultant barrier layer is stable and drip-free and is inspected so minor defects can be remedied. A time lag of several hours before winding the major portion of the sidewall of the barrier layer subassembly is completely acceptable if an epoxy resin plus acid anhydride curing agent system is used having an extended pot-life of 12 to 15 hours. There can be stockpiling of mandrels carrying the stable barrier layers prior to transfer to a filament-winding apparatus where multiple passes are carried out to helically wind fiberglass tows from end to end atop the barrier layer. Thereafter, curing the epoxy resin system at a temperature of about 100° C. for about 4–5 hours produces a structurally strong, defect-free pressure vessel having an integral sidewall.

20 Claims, 2 Drawing Sheets

METHOD OF MAKING PRESSURE VESSELS

This invention relates to methods of making pressure vessels and more particularly to making fiber-reinforced pressure vessels from epoxy resin materials by winding about mandrels.

BACKGROUND OF THE INVENTION

Pressure vessels useful for a variety of applications have long been made from synthetic resinous materials, such as epoxy resins, acrylic resins and polyurethane resins. Such vessels are frequently provided with adequate strength to withstand high internal pressure by the employment of fiber reinforcement, e.g. windings of continuous filaments. Pressure vessels of this type have found significant use in ultrafiltration (UF), reverse osmosis (RO), nanofiltration (NF), microfiltration (MF) and other types of fluid separation or filtration systems wherein a feedstream is being separated into a permeate or filtrate stream and a concentrate stream. Such applications often require one or both ends of the pressure vessel to have full bore access for the insertion/removal of separation cartridges having generally right circular cylindrical shape, and such pressure vessels have advantageously been fabricated by winding on cylindrical mandrels.

U.S. Pat. No. 5,305,601 illustrates providing resin-impregnated fibrous rovings containing long lengths of continuous filaments and winding them about a rotating mandrel or other body, or alternatively feeding them through a shaping die, to form a tubular article that may be used as a part of a solid fuel rocket motor assembly. The patent illustrates state-of-the-art filament-winding systems which are commercially available, and the disclosure of the patent is incorporated herein by reference.

U.S. Pat. No. 5,772,938 shows making a storage tank by winding discrete fibrous bundles of filaments onto a mandrel using apparatus which applies a viscous resinous material either interior of or exterior of a helical wound layer of such bundles, followed by curing to form a hollow cylindrical structure.

Even with apparatus of the types depicted in these patents, methods for making fiber-reinforced pressure vessels having full bore access have heretofore been relatively labor-intensive and unfortunately have frequently resulted in the production of significant percentages of vessels that failed to meet initial quality control inspection. As a result, there has long been a desire to search for improved manufacturing methods for making pressure vessels of this general type.

SUMMARY OF THE INVENTION

It has now been found that, by dividing the task of making such fiber-reinforced, tubular pressure vessels into two stages or segments, not only can the task be made less labor-intensive but also the product quality is significantly improved, resulting in far less effort being needed in order to meet quality control standards and essentially eliminating the significant number of vessels that otherwise would not meet quality standards and would face rejection. This improvement in pressure vessel manufacture is achieved by first forming a thin, stable, barrier layer on a polished steel mandrel which can then be visually inspected for the presence of any imperfections in its structure. The resultant item not only serves as the interior surface region of the completed pressure vessel, but more importantly, it also subsequently becomes integral with the remainder of sidewall of the pressure vessel. This objective is achieved by employing a mixture of two compatible resin systems of appropriate viscosity for impregnation of the fibrous material, which resin systems are curable by different means. By first applying a helical winding of such polymer-impregnated fibrous material and then promptly curing one of the two resin systems without cross-linking the other resin system, a stable, drip-free barrier layer is created in the form of a thin tubular structure which can be visually inspected and which will ultimately constitute the interior surface region of the pressure vessel. The promptly curable resin system is advantageously one which can be cured within about 5 to 15 minutes and preferably one that is curable by UV radiation or the like.

At the end of this first production stage or segment, an inspection is carried out, usually visually, and if minor imperfections are discovered, they can usually be remedied at this stage of fabrication, during which time the other resin system material, which desirably constitutes at least about 90% of the overall polymer material, remains uncured. Subsequent to either passing such inspection or following optional repairs to correct any defect, the major portion of the pressure vessel sidewall is formed, in essentially standard fashion, by applying multiple wrappings of fibrous material, which includes long fibrous strands, impregnated and coated with the other of the two resin systems to create a tubular lay-up, having a wall thickness desired for the ultimate pressure vessel, immediately exterior of the barrier layer. Thereafter, the uncured other or second resin system, which constitutes 100% of the polymer portion of the exterior region and a major portion of the polymer material of the internal barrier layer region, is suitably cured, as by the application of heat, or by other suitable means as well known in the art of thermosetting resins. Because at the end of this second stage of the fabrication process, the second resin that is being cured is distributed throughout the entire body, the resultant structure is truly integral, and the product meets all ASME code standards for single wall pressure vessels.

By dividing the fabrication process into two such production stages, the first of which is somewhat labor-intensive but short in duration, and the second of which is fairly highly automated, significant cost advantages are achieved in addition to the substantial improvement in quality mentioned above. In addition, because the initially completed barrier layer is in stable, drip-free condition, the two stages of fabrication can be carried out at different stations and with a substantial time gap therebetween. Such an arrangement can ease scheduling problems and thereby can result in improvements in overall production; for example, operations may be staged so that a single barrier layer application station supplies mandrels containing the barrier layer subassembly to several winding stations or so that multiple stations produce barrier layer-mandrel subassemblies as a result of which a ready supply will be available for a day's planned production. Such short term stockpiling is feasible because there may be a delay of several hours, e.g. 10 hours or more, following the completion of the winding and inspection of the barrier layer, before beginning to wind the main body of the pressure vessel thereabout without incurring any disadvantage; in other words, this desirable flexibility in production scheduling may be achieved so long as a second resin system is chosen which has a pot-life such that it will remain in a mixed but uncured state for periods of, e.g. 10 to 15 hours, and can then be effectively cured, as by heating or by other means.

DETAILED DESCRIPTION OF THE PREFERRED EMBODIMENTS

Figure 1:
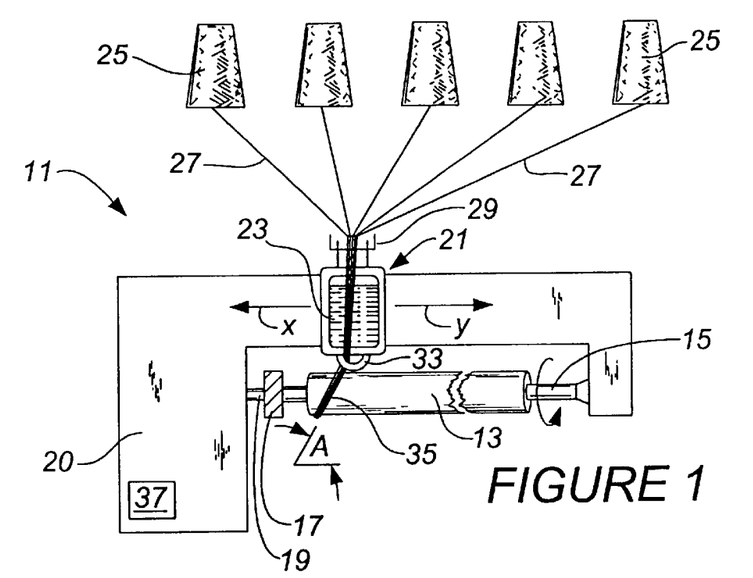
FIG. 1 is a schematic drawing showing a filament winding apparatus which may be used to carry out one or both stages of a method of fabricating a fiber-reinforced polymeric pressure vessel embodying various features of the invention.

Apparatus for manufacturing tubular pressure vessels from polymer-impregnated fibrous material is commercially available, and one such apparatus 11 is schematically depicted in FIG. 1. Very generally, the apparatus 11 includes a cylindrical mandrel 13 which is mounted for revolution about its axis in a main section of an overall machine body 20. Generally, one end of the mandrel 13 is supported by a spindle 15, and its opposite end is secured to a suitable chuck 17 which connects to a drive shaft 19 that is driven by a suitable drive motor located within the machine body 20. Mandrels 13 of a variety of different sizes and lengths can be used; e.g., mandrels of 4, 6 or 8-inch diameter are often used. An upper frame portion of the machine supports a carriage 21 which is designed to reciprocate back and forth along a set of rails that extend generally along the entire length of the mandrel. The carriage 21 supports a reservoir 23 of viscous, liquid polymer material.

When the apparatus 11 is designed for winding an elongated pressure vessel, it is adapted to draw tows or bundles of continuous filaments or strands from a plurality of spools or creels 25 of fibrous material.

Preferably, spools 25 holding long lengths of tows 27 of continuous filaments of glass fiber or the like are appropriately supported in association with the frame, and such tows from each of the spools are fed through a guide 29 so that they enter the reservoir 23 of viscous polymer material wherein they become coated and/or impregnated with this polymeric material. These coated tows are then gathered and fed through an arcuate guide 33 as a part of a group 35 of tows that is to be helically wound about the surface of the rotating mandrel 13. A control system 37 mounted upon the machine body 20 of the apparatus 11 causes the carriage 21 to slowly reciprocate from one end to the other, in directions parallel to the axis of the rotating mandrel 13, see arrows x and y, so as to create a helical winding of the polymer-impregnated gathered tows 35 of fibrous material about the rotating mandrel. The speed of rotation of the mandrel 13 and the linear speed of the reciprocating carriage 21 are regulated by the control system 37 to maintain the winding at a desired angle A. When the winding reaches one end of the mandrel (the length of which can be programmed into the control system 37), the carriage 21 reverses and the next course of helical winding is carried out in the opposite or reverse direction.

Figure 2:
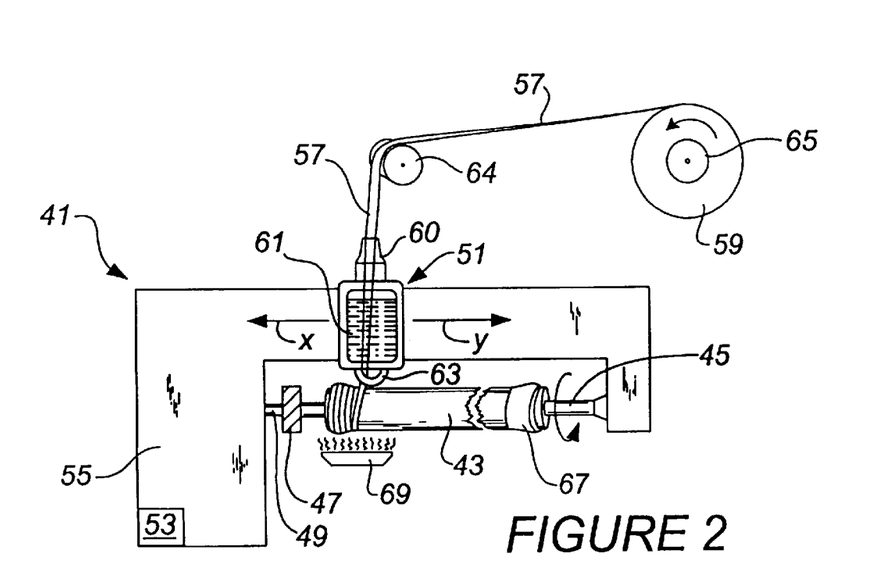
FIG. 2 is a schematic drawing showing a tape winding apparatus which may be used to carry out the first stage of a method of fabricating a fiber-reinforced polymeric pressure vessel embodying various features of the invention.

Although the desired barrier layer could be fabricated using the apparatus 11 and optionally feeding from fewer spools, a somewhat simpler apparatus is preferred, such as the apparatus 41 depicted schematically in FIG. 2, wherein the barrier layer is formed by helically winding a strip or tape of fibrous material having a desired width and thickness. Such a material is commercially available in large diameter rolls; for example, a three-inch wide tape of nonwoven polyester material may be employed. The tape-laying apparatus 41 depicted in FIG. 2 includes a mandrel 43 mounted horizontally between a spindle 45 and a chuck 47 that is rotated about its axis by a drive shaft 49 while a tape-laying carriage 51 traverses from left to right along the length of the mandrel 43. The tape-laying apparatus 41 can be semiautomatically controlled or manually controlled by a machine operator utilizing a control panel 53 which is mounted on the machine chassis 55 of the apparatus. As tape 57 is unwound from a large spool 59 of tape, it is fed through an entrance guide 60 before it passes through a reservoir 61 of viscous polymer material and exits through an exit guide 63 on its path to the rotating mandrel 43. Interposed between the guide 60 and the spool 59 is a lead-in roller 64, and tension is maintained in the tape 57 by a brake device 65 which is associated with the spool of tape and controlled by the apparatus control system 63 to maintain a desired amount of tension in the tape being wrapped onto the mandrel 43. Suitable fittings or tooling 67 that will be a part of most ultimate pressure vessel end closures, as explained hereinafter, are optionally installed on the mandrel before the tape winding begins, as indicated in the flow sheet, FIG. 3.

Arranged in association with the carriage 51 is an ultraviolet(UV) light emission device 69 which is focused either on the coated tape 57 or on the section of the mandrel 43 to which the tape was just applied; this emission device travels along with the carriage 51. The UV radiation that is employed initiates prompt curing of one resin system of the polymeric material, as explained hereinafter, and creates a clear, stable, drip-free barrier layer of desired thickness on the exterior surface of a polished chrome-plated steel mandrel.

In order to effectively create such a barrier layer that will then serve as the interior surface of a fiber-reinforced pressure vessel, suitable fibrous material, e.g. woven or nonwoven synthetic fiber tape 57, a few inches in width, is impregnated with viscous polymer material in the form of a mixture of two resin systems which are curable by different means, as by different chemical mechanisms for cross-linking. The first resin system is one that can be cured relatively rapidly, preferably by radiation, and the second resin system is one that has a relatively long pot life, e.g. of at least about 5 and preferably of about 10 to 15 hours or more, and which is cured by a mechanism other than radiation, preferably being cured at elevated temperature, i.e. by application of heat, although other curing/cross-linking mechanisms as well known in this art can alternatively be used. Through the use of such a combination of resin systems, it is possible to initially create a barrier layer in the form of a thin tubular structure of clear material that exhibits a physical character similar to that of Jello gelatin dessert or crystallized honey. Overall, the cured first resin system creates a polymeric framework that is sufficient to contain the remaining uncured second resin system, that constitutes the major portion of polymer material mixture which is supplied to the reservoir 61. The result is a stable and drip-free tubular structure that retains its shape even though no longer being rotated about its axis. Of course, the first and second resin materials must be compatible, e.g. miscible with each other, in order to ultimately create a strong integral cured material.

To this end the reservoir 61 is filled with a polymeric material mixture which comprises a radiation-curable first resin system and a second resin system which is essentially unaffected by such curing radiation (so that it remains uncured), but which is subsequently curable under other conditions. The first resin system includes a suitable resin and curing agent which when subjected to radiation conditions is cured, e.g. cross-linked, to create a framework which immobilizes the partially cured mass, more particularly the uncured second resin system. The first resin system may include acrylic resins, polyvinyl resins, polyester resins, epoxy resins and the like.

Acrylic resins are preferred for the first resin system, and examples of acrylic resins include esters and amides of methacrylic acid as well as copolymers thereof with other copolymerizable monomers. Representative esters include methyl acrylate, methyl methacrylate, hydroxy ethyl acrylate, butyl methacrylate, octyl acrylate, and 2-epoxy ethyl acrylate. Representative amides include butoxymethyl acrylamide, methylacrylamide, and tert-butyl acrylamide. Copolymers of such compounds, as well as copolymers with other monomers containing polymerizable vinyl groups may be used. Polyacrylates may also be used, e.g. 1,2-butylene glycol diacrylate, diethylene glycol diacrylate and polyethylene glycol diacrylate. The reaction products of methacrylic acid and either epoxy resins or urethane resins may also be used.

UV-curable epoxy resins may also be used as the radiation-curable first resin systems, and examples include the cycloaliphatic epoxides, such as limonene dioxide, limonene oxide and alpha-pinene oxide, and the aliphatic epoxides, such as butyl diglycidyl ether and neopentyl glycol diglycidyl ether. Such epoxy resins are generally disclosed in U.S. Pat. No. 4,412,048.

Other compounds that are curable under radiation conditions include methacrylic acid esters, e.g. methacrylic acid esters of polyhydric alcohols, and vinyl monomers, e.g. styrene, vinyl toluene, vinyl pyrrolidone, vinyl acetate and divinyl benzene.

By radiation is meant electromagnetic radiation having a wavelength of about 700 nm or less which is capable, directly or indirectly, of curing the first resin system of the polymeric material mixture. Indirect curing means curing that is initiated by another compound that is a part of the first resin system. Curing by UV radiation is preferred.

Photoinitiators suitable for ultraviolent (UV) radiation-curing of acrylic, methacrylic and vinyl monomers include free radical-generating UV initiators, such as benzopheneone, diethoxy-acetophenone and the like. Infrared initiators include cumene hydroperoxide, benzoyl peroxide, asobisisobutyronitrile, and also azo and peroxide compounds. When the radiation-curable first resin system includes an epoxy resin, the photoinitiator may be a UV initiator which liberates a Lewis acid and/or Bronsted acid, such as iodonium salts, sulfonium salts, arsonium salts and diazonium salts.

The general amount of the photoinitiator required for curing a given polymeric composition is known in this art and precise amounts can be experimentally determined. For UV-curable epoxy resins, for example, Lewis acid or Bronsted acid-releasing initiators may generally be included as a part of the first resin system at a concentration of about 1–5 percent by weight of the epoxy resin.

The second resin system should not be radiation-curable so that it will remain uncured and thus of the same character as the resin system which will constitute the major outer portion of the pressure vessel sidewall. However, the second resin system is chosen to be compatible, e.g. miscible, with the first resin system. The second resin system may be curable under any suitable curing conditions as generally known in this art, e.g. by (1) elevated temperature, (2) moisture exposure, (3) ambient temperature or (4) radiation exposure of a different wavelength from the radiation used to cure the first resin system. Suitable second resin systems include epoxy resins, polysilicones, polyester resins, polyvinyl resins and polyurethanes; epoxy resins have excellent strength and are preferred.

Suitable epoxy resins will have at least one, and preferably two or more polymerizable epoxy groups per molecule. Suitable epoxy resins include those derived from epichlorohydrin and dihydric phenols, e.g. Bisphenol A, Bisphenol F, resorcinol, hydroquinone, p-p'-dihydroxybenzophenone, p-p'-dihydroxydiphenyl, p-p'-dihydroxydiphenyl ethane, bis (2-hydroxynaphthyl)ethane, and 1,5-dihydroxynaphthalene, and may include copolymers with novolac resins. Bisphenol A and F are the preferred dihydric phenols and are used in many commercially available epoxy resin formulations. Epoxy resins are well known in the art and are described in "Handbook of Epoxy Resins" by Lee and Neville, McGraw-Hill Book Co., New York (1967).

Conventional heat-activated epoxy resin systems of a type well known in the art are preferably employed as the second resin system. Examples of such resin systems are described in "Epoxy Resins, Chemistry and Technology," May and Tanaka, Marcel Dekker, Inc., New York (1973).

They may typically include curing agents of the following types: (a) acid anhydrides, such as hexahydrophthalic anhydride, tetrahydrophthalic anhydride, and the like; (b) Lewis acid (cationic) catalysts, such as boron trifluoride monoethyl amine, and the metal halides of tin, aluminum, zinc, and the like; and (c) imidazoles, such as derivatives of 2-phenyl imidazole or of 1-cyanoethyl-2-phenylimidazole.

Alternatives to epoxy resins for the second resin system include polyester resins, polyvinyl resins, silicones and polyurethane resins. RTV silicones, e.g., oxime polysiloxane materials, that may be conventionally moisture-cured, are an example of one alternative group that may be used. Thermosetting and moisture-curable polyurethane resins may also alternatively be used; these are generally formed as condensation products of polyisocyanates and active hydrogen-containing compounds, such as polyesters prepared from polycarboxylic acids and polyhydric alcohols and polyhydric polyalkylene ethers having at least two hydroxy groups.

The particularly preferred second resin system includes a well known cycloaliphatic epoxy resin and an acid anhydride curing agent which system is curable at elevated temperatures in the range of about 70° C. to about 175° C.

The relative proportions of the respective first and second resin systems that constitute the polymeric material in the reservoir 61 are generally determined by the criterion that the cured first resin system should create a framework adequate to immobilize the remaining uncured mass of the second resin system until it has in turn been cured. Generally, the concentration of the first resin system is between about 5 to about 15 percent by weight, based on the total weight of the first and second resin systems, and preferably the first resin system constitutes from about 7 to about 11 percent by weight, based on the total weight of the first and second resin systems. Particularly preferred concentrations of the first resin system in the polymeric material mixture, when the first resin system includes an acrylic resin and the second resin system includes an epoxy resin, are between about 8 and about 10 percent by weight, based on the total weight of the first and second resin systems.

The thickness of the barrier layer should be maintained within certain parameters, and generally the thickness should be at least about 0.005 in (0.13 mm) and should not exceed about 0.035 inch (0.89 mm). Preferably the thickness of the barrier layer is at least about 0.012 inch (0.30 mm) and not greater than about 0.015 inch (0.38 mm), regardless of the intended thickness of the ultimate pressure vessel sidewall that is to be created. By carefully maintaining the thickness within this fairly narrow range, excellent results have been attained. Typically, pressure vessels that are to be used as housings for spirally wound membrane elements are made to have interior diameters of, for example, 4 inches, 6 inches and 8 inches in the United States at this time. Very generally, the thickness of the pressure vessel sidewall will usually be between 2.5% and about 10% of the radius of the mandrel. More specifically, for a 4-inch diameter pressure vessel formed primarily of fiber-reinforced epoxy resin, the vessel sidewall may have a nominal thickness of about 1/16th of an inch (1.6 mm). Generally, the outer region of the sidewall will normally be at least about four times the thickness of the barrier layer; accordingly, the pressure vessel sidewall will be at least about five times the barrier layer thickness. An 8-inch diameter pressure vessel may have a sidewall thickness of about three-eighths of an inch (9.5 mm). Such dimensions are to some extent dependent upon the ASME pressure rating for which the pressure vessel is being constructed to meet, and thicker sidewalls might be employed if it should be desired to increase the standard pressure rating of the vessel or perhaps if the vessel were to be over about 90 inches long. More generally, pressure vessels for use in separation operations have become somewhat standardized, i.e. having lengths designed to accommodate filtration or separation cartridges in multiples of 40 or 60 inches in length, e.g. to accommodate nominal lengths of 80, 120, 160, 180 inches, and such generally requires the pressure vessel to be some 8 to 10 inches longer to accommodate the end closures. Moreover, although not illustrated, it is well known that two or more pressure vessels can be formed at one time on a single mandrel of appropriate length.

To assure that the barrier layer will be within the desired thickness limits, a fibrous tape or strip of suitable character is chosen for use with the tape-laying apparatus. Although a flat woven material might be employed, it is felt preferable to use a calendared, nonwoven polyester fiber material having a thickness not greater than about 0.007 in (0.18 mm); most preferably, a tape is used that has a nominal thickness of about 0.005 inch (0.13 mm) when the maximum thickness of the barrier layer is about 0.015 inch. Similarly, the width of the fiber-reinforcing tape can vary within reasonable limits, for example, a tape having a width of between about 3/4 in (1.9 cm) and about 5 in (12.7 cm) may be used. The tape 57 is fed through the reservoir 61 which includes the polymeric material that is a blend of the first and second resin systems. The viscosity of the polymeric material may be between about 500 cps and about 1,000 cps, and the fibrous tape is routed, e.g. under a guide roller, so that it becomes impregnated with the polymeric material filling its interstices and covering both its surfaces. The polymer-impregnated tape is wound helically about the rotating mandrel 43 by causing the carriage 51 to move from left to right as depicted in FIG. 2, thereby creating a barrier layer for one or more pressure vessels depending upon the sets of end closure fittings located on the mandrel or, if integral end closure fittings are not being used, simply depending upon multiple of individual lengths. The speed of the rotating mandrel 43 and the linear speed of the carriage 51 are regulated by the control system 53 so that there is an overlap of between about 30% and 50%, preferably between about 35 and 45% and most preferably of about 40% with respect to the tape being laid down. Thus, for an overall barrier layer of a thickness of about 0.015 inch, about 80% of the surface area of such barrier layer is made up of a double thickness of the fibrous polyester material. So as to avoid wrinkling and maintain the tape in a just slightly stretched condition, which has also been found to facilitate achieving precise tracking, a tension of about 1.7 pounds (770 grams) is applied using the tensioning brake 65.

The radiation-emitting device 69 travels with the carriage 51 from one end of the mandrel 43 to the other and is used to supply the desired intensity of radiation to partially cure the polymeric material carried onto the mandrel by the tape being wound helically about the rotating mandrel. As earlier indicated, the preferred radiation is UV, and accordingly a UV source, e.g. UV lamps, is provided, which is supported so as to focus on the polymer-impregnated tape as it is being wound onto the mandrel as well as on that region of tape which was just earlier applied. An amount of UV radiation is applied that is adequate to assure the prompt curing of the first resin system and stabilization of the entire polymeric material mixture by the time that the tape-winding operation is complete. Such may generally be achieved by a 6-inch UV electrodeless lamp of about 300 watts per inch spaced about 3 inches from the surface of the mandrel.

Because pressure vessels are preferably created with integrally contained end closures, such as those shown for example in U.S. Pat. No. 5,720,411 to Darby et al., the disclosure of which is incorporated herein by reference, appropriate fittings 67 and/or tooling are preferably appropriately located on the mandrel 43 prior to the beginning of the tape winding so as to result in creation of one or more pressure vessel assemblies of the desired length, as generally shown in FIG. 2 of that patent, when the filament-winding and curing have finally been completed. As earlier indicated, depending upon the length of the mandrel and the length of the desired pressure vessels, it may be appropriate to install two or more sets of fittings/tooling on one mandrel so that laying tape along the entire length of the mandrel will create the respective barrier layer portions for a plurality of pressure vessels.

Once the tape-laying operation on a mandrel is complete, it can be inspected in place on the apparatus 41 for any imperfections, or it can be moved if desired to an inspection station so that another mandrel 43 can be substituted and the requisite fittings/tooling 67 installed thereupon to ready it for a repetition of the tape-laying production step. Because the polymer material which is used is nonpigmented and therefor highly translucent, bordering upon transparent, the inspection can be carried out optically, i.e. visually. Common defects that may occur include the entrapment of an air bubble or of some foreign substance, such as a small insect, between the polished metal surface of the mandrel 43 and the polymer-impregnated tape. Because of the only partially cured character of the polymeric material, such a defect can usually be remedied by carefully slitting the barrier layer with a single-edge razor blade or the like to allow the entrapped air to escape or to remove any impurity and then smoothing the layer so that the interior region of the barrier layer is flush against the polished surface at this point.

Although unlikely, it is possible for severe wrinkling of the tape to occur in a localized region, and such can be potentially repaired by excision of the defective region and manual replacement with an appropriately resin-impregnated patch, which might for example be 3–6 in square. Another more serious defect that might occasionally be detected would be the discovery of a substantial amount of dirt or other foreign matter contaminating a significant section of the barrier layer. Such a serious defect of this type may well be incapable of being cured, and as a result of such inspection, the barrier layer might be physically unwrapped from the mandrel and discarded so that, after cleaning, the mandrel and the installed fittings could be again installed upon the tape-laying apparatus to repeat the operation. Although such a practice is clearly not as satisfactory as being able to remedy the defect, it should be understood that the loss is considerably less than if unremedible defect were not discovered until the entire pressure vessel had been completed and removed from the mandrel for inspection, which would of course result in the scrapping of the entire completed pressure vessel.

Once the mandrel with its completed barrier layer has either passed inspection or had any defect appropriately remedied, the mandrel is ready for installation on a standard filament winding apparatus 11 such as that depicted in FIG. 1. As earlier indicated, an advantage of the invention is to provide considerable flexibility in production scheduling. By appropriately choosing the second resin system, the completed barrier layer subassembly on a mandrel can be allowed to languish for 5 to 10 hours or even 15 hours or more before completing the filament winding and/or final curing step. It is generally preferred that the filament-winding step be started at between about 2 hours and about 10 hours following the start of said barrier layer formation step. There are, for example, commercially available epoxy resin and acid anhydride curing agent systems that are curable at elevated temperatures, i.e. usually at least about 80° and preferably at about 100° C. or greater, which will have a pot-life of 12 to 16 hours, and the polymeric material mixture supplied to the reservoir 61 for the tape-laying machine desirably includes such an epoxy resin system as the second resin system, which will constitute the major portion of the mixture. This particular resin and curing agent should also be used as the entire resin system in the reservoir 23 for the filament-winding apparatus so the sidewall of the ultimate pressure vessel will truly be an integral structure. As a result, the filament-winding operation may begin, for example, 8 or 10 hours after the inspection has been completed, but yet the ultimate curing will produce a pressure vessel having a sidewall that is integral in its polymeric resin structure, which would be classified as meeting ASME Section X Code standards for vessels with integral fiber-wound resin impregnated sidewalls.

The filament-winding apparatus 11 is commercially available, and the operation of filament-winding pressure vessels using such apparatus is part of the prior art. Such a winding operation could utilize from 1 to about 50 spools of filament tows; however, usually from about 5 to about 20 spools are employed. Although various filaments might be employed, including carbon filaments and/or synthetic polymeric filaments, fiberglass filament tows have become state-of-the-art for applications requiring only moderate tensile strength from the reinforcing materials; thus, fiberglass filaments have become the filaments of choice for many pressure vessels at the present time. Such elongated fiberglass filaments are commercially available in tows, which are groups that are gathered and slightly twisted to provide discrete bundles, which tows are then wound onto spools or creels to produce the items depicted in FIG. 1 by reference numeral 25.

The filament winding process is a generally semiautomatic one; once it is manually started, it proceeds generally automatically. The process is begun at one end of the barrier layer subassembly, and the carriage 21 containing the reservoir 23 of polymer material, through which the individual tows 27 are routed, slowly reciprocates toward the opposite end of the mandrel as helical winding of the polymer-impregnated tows about the rotating mandrel proceeds. Generally, the ultimate pressure vessel will have a thickness of five or more times of that of the barrier layer, and such is created as a result of the mandrel being wrapped with multiple layers of the wound filament tows. Frequently, there will be at least about 4 or 5 passes of the carriage from one end to the other for fabrication of a pressure vessel, and for the fabrication of the sidewall of an 8-inch diameter pressure vessel, frequently the filament winding process will include as many as 15 layers and an overall winding time of about 45 minutes to 1 hour.

Following the completion of such filament winding of the major portion of the pressure vessel sidewall, the mandrel assembly is transferred to a suitable oven for the curing of the second resin system. As indicated, an epoxy resin which cures at an elevated temperature is preferred, and accordingly the entire mandrel assembly is transferred to an air-circulating oven that is maintained at a temperature of about 100° C. wherein it is held for a time of about 3 to 10 hours and usually for about 4 to 5 hours. Heating to this temperature for such a time period assures thorough curing of the second resin system which is distributed throughout the entire fiber-reinforced sidewall and thus results in a strong integral tubular pressure vessel. If desired, the mandrel assembly can be optionally ramped to the desired curing temperature of about 100° C.; however, such is not considered necessary, and the temperature can be allowed to simply rise naturally from ambient to the curing temperature following insertion into a circulating air oven.

Upon completion of the curing of the epoxy resin, the mandrel-pressure vessel assembly is removed and allowed to cool naturally to ambient or room temperature. If more than one pressure vessel has been fabricated on a single mandrel, there may be joinder between the barrier layers which may have been optionally continuously applied along the entire length of the mandrel; if so, severing is preferably carried out prior to the removal of a pressure vessel and its end closure fittings from the mandrel. Thereafter, inspection, grinding, painting and removal of any sacrificial inserts such as described in the '411 patent, is carried out to produce the final integral pressure vessel. As earlier indicated, the advantages of this two-step production process are dramatic in that there is an extremely high pass rate of the final pressure vessels upon inspection and seldom is any defect detected that cannot be remedied, as a result of which there are essentially no pressure vessels that need to be scrapped.

Figure 3:
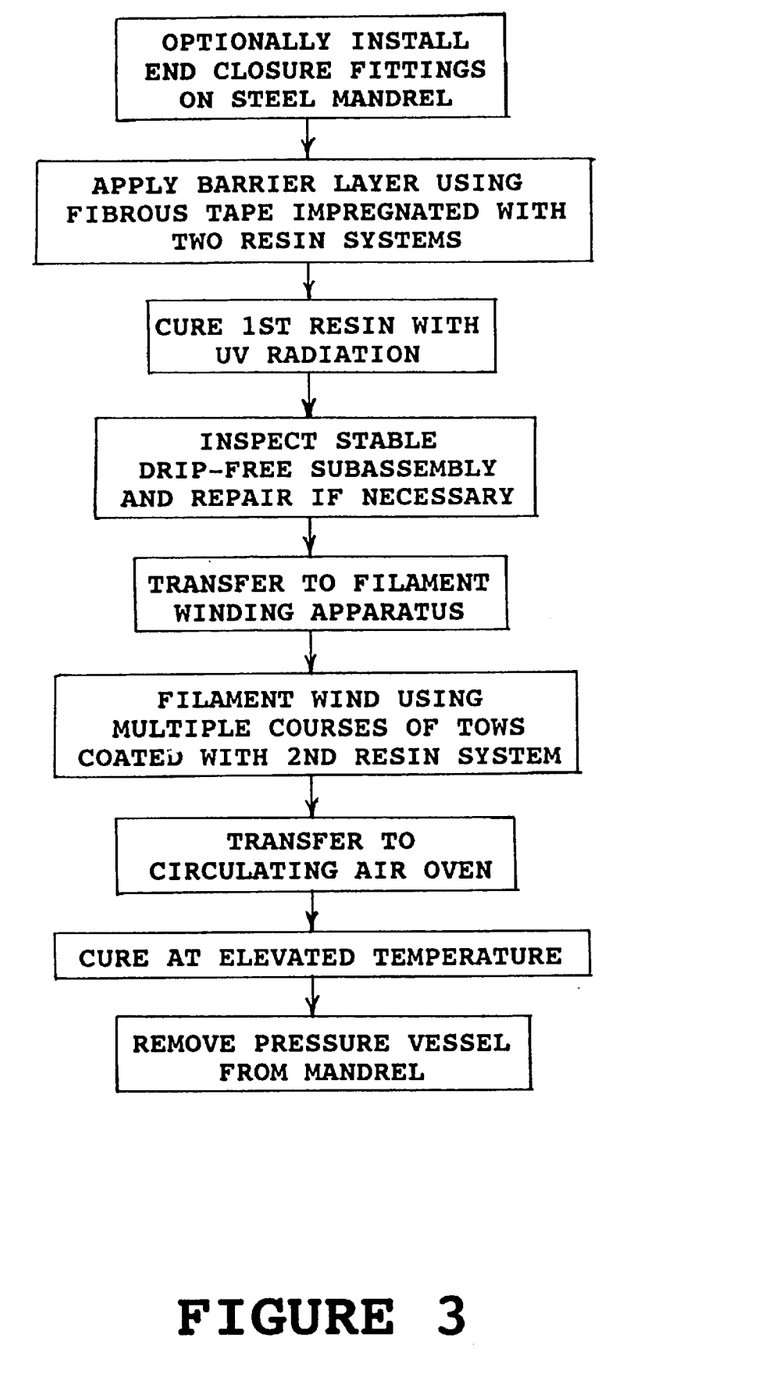
FIG. 3 is a simplified flow sheet showing a preferred method of making tubular pressure vessels embodying various features of the invention.

An example of an operational process is hereinafter described with respect to the flow sheet shown in FIG. 3. A pressure vessel having an interior diameter of 4 inches and a length of about 90 inches, that is designed to accommodate two 4-inch diameter, 40-inch long separation cartridges, is manufactured using a polished chrome-plated steel mandrel 43 having a 4-inch OD and a length of about 100 inches. One set of end closure fittings 67, together with spacers and sacrificial inserts, are installed at the desired locations near each end of the mandrel as generally disclosed in FIG. 2 of the '411 patent, and the mandrel assembly with the tooling/fittings 67 in place is then installed in operative position in a tape-laying apparatus 41 of the general type shown in FIG. 2.

When production is ready to begin, the reservoir on the carriage 51 is filled with a mixture of Submixtures A, B and C. Submixture A contains a cycloaliphatic epoxy resin blend obtained from the Dow Chemical Company as Xu 19055.00. About 52 parts by weight of Submixture A are used for each 48 parts by weight of Submixture B, containing a liquid acid anhydride blend marketed as Lindride by Lindau Chemical Company (which functions as an elevated temperature curing agent for cycloaliphatic epoxy resins). Submixture C is an acrylic resin blend monomer/prepolymer marketed by the Loctite Corporation as Accuset®M, which contains about 75 percent of methacrylate ester, about 20 percent of hydroxyalkyl methacrylate and the remainder a UV-activated photoinitiator for these acrylic resins, and it is included in an amount of about 10 parts by weight for each 100 parts total of Submixtures A and B. The viscosity of the final liquid polymeric material mixture containing Submixtures A, B and C is about 750 cps.

Fibrous tape material 57 in the form of a nonwoven 3-inch wide strip of polyester fibers having a thickness of about 0.005 inch (0.013 cm) is fed from a large roll 59, using the tensioning brake mechanism 65, under a guide roller in the reservoir 61 and then out and through the guide 63, as a result of which the fibrous material is impregnated and coated with the polymeric material mixture. The tensioning brake mechanism 65 is set to maintain tension of about 1.7 pounds on the fibrous material that is being helically wound onto the rotating mandrel 43 so as to avoid wrinkling and maintain desired thickness in the major sidewall region. The mandrel 43 is caused to rotate at a speed of about 50 rpm, and the carriage 51 starts at the far left-hand end, with the polymer-impregnated tape being initially wound so as to overlap the left-hand end of the end closure fitting at the beginning of the helical winding process. The carriage 21 is set to slowly travel to the right so that it travels a distance of about 1.5 in (3.8 cm) for each revolution of the mandrel, causing the tape to be helically wound about the rotating mandrel so as to cover both the mandrel surface and the end closure fittings. The speed of the travel of the carriage is carefully controlled by the control system 53 so that there is an overlap of about 40%, i.e. the tape being laid down on each revolution of the mandrel overlaps for about 1.2 in (3 cm) upon the tape that was laid down on the previous revolution. A source 69 of UV radiation in the form of one 6-inch UV lamp having an intensity of about 300 watts per inch is arranged at a distance of about 3 inches from the surface of the mandrel, and it is focused so as to radiate onto the polymer-impregnated tape as it is being laid upon the rotating mandrel surface. The UV source 69 is suitably supported by the carriage so that it travels along with it for the length of the mandrel. The winding is completed when the tape covers a predetermined short distance on the mandrel to the right of the end closure fitting, and the tape is then severed.

With the barrier layer complete, the mandrel-barrier layer subassembly is allowed to rotate for an additional 1 minute under the UV radiation adjacent its right-hand to assure that the curing of the acrylic resin system has resulted in the creation of a stabilizing framework that immobilizes the much larger volume of epoxy resin and anhydride curing agent which constitutes the major portion of the polymeric material. Thereafter, the rotation of the mandrel may be halted, and inspection of the stable, drip-free layer may be carried out either while the subassembly remains in the tape-laying machine or at a separate inspection station. The former is preferred so that, if there are any regions that appear to be deficient in resin, additional resin can be manually applied from the reservoir 61, as by brushing, and UV radiation applied.

The inspection carefully checks for the presence of air bubbles and foreign matter, and such defects can nearly always be remedied by slitting with a single-edge razor blade or the like to eliminate the trapped air or remove any foreign matter and then smoothing the region. As previously mentioned, if there is wrinkling or some other abnormality in the fibrous material that was wrapped upon the mandrel, it may be possible to carefully manually excise a small region and then manually apply additional polymeric material and a fibrous patch. In the unlikely instance that a major defect has occurred or foreign material or dirt has become embedded at the interface between the barrier layer and the mandrel to such an extent that repair is deemed impractical or impossible, the barrier layer is simply removed by unwinding the polymer-impregnated fibrous tape or severing the tape in an axial direction and peeling the barrier layer from the mandrel. Such is appropriately disposed of, and solvent-cleaning of the mandrel and the end closure fittings renders them ready for another pass through the tape-laying apparatus. Because such imperfections are now detectible at an early stage prior to the winding of the major portion of the sidewall and the lengthy curing and finishing steps, there is a very substantial saving in both time and material costs, compared to the undesirable alternative of scrapping a completed pressure vessel when such a defect is discovered at the very end of the production process.

Once the inspection is complete and/or any minor defects that were discovered have been remedied, the mandrel-barrier layer subassembly is ready for transfer to the filament winding station. However, the pot-life of the epoxy resin-acid anhydride curing agent system is such that a time lag of 5 to 10 hours or even 12 hours or more between the start of the tape-laying first step and the beginning of the second filament-winding step can be acceptable. It has been found that such an epoxy resin system, once cured at its preferred curing temperature of about 100° C., produces a strong cross-linked structure which is integral throughout the entire sidewall even though, for example, 10 hours or more have passed since the mixing of the polymeric material to fill the reservoir 61 on the tape-laying apparatus 41.

As a result of the foregoing, it is possible to divorce the scheduling of the first tape-laying operation and the second filament-winding operation from each other. This allows the stockpiling of one or more mandrel-barrier layer subassemblies ready for transfer to the next available filament-winding apparatus 11 of the type generally illustrated in FIG. 1.

As an example of a typical filament winding operation, tows of fiberglass filaments sold by Certainteed Fiberglass Co. as RO 99 are fed from 40 spools, gathered at the guide 29 and routed through the reservoir 23 which is filled with a mixture of the same Dow Chemical Xu 19055.00 epoxy resin and liquid acid anhydride curing agent in the same weight ratio as was present as the major part of the polymer mixture in the reservoir 61 of the tape-laying apparatus. The filament winding operation is state-of-the-art. For fabrication of a 4-inch diameter, 90-inch long pressure vessel, the carriage 21 is caused to travel the entire length of the mandrel and then to reverse itself and travel the entire length again in the opposite direction. To produce a pressure vessel having a total sidewall thickness of about 0.015 inch (0.38 cm), 2 or 3 filament-winding passes along the mandrel are employed, thus creating 2 or 3 layers of helically wound fiberglass tows, disposed radially outward of one another, which constitute the pressure vessel sidewall.

Upon completion of the winding operation, the mandrel-pressure-vessel assembly is transferred to a circulating-air oven where it is preferably rotated at a slow speed of about 3 rpm while elevated temperature curing takes place over a period of about 4 hours. Although rotation throughout the entire curing operation is preferred, it is generally acceptable to halt rotation after about 2 hours at a temperature of at least about 80° C. Once final curing has been effected, the mandrel is simply removed from the air-circulating oven and allowed to cool to ambient temperature. Removal of the pressure vessel from the mandrel is then carried out, and inspection of the interior right circular cylindrical surface of the pressure vessel shows a defect-free structure. Following installation of end closures, the pressure vessel is tested at slightly above its rated pressure and shows excellent strength; thus, after final finishing and painting, the pressure vessel is ready for delivery to a customer.

Although the invention has been described with regard to certain preferred embodiments which constitute the best mode presently known to the inventors for carrying out their invention, it should be understood that various modifications and changes as would be obvious to those having the ordinary skill in this art may be made without departing from the invention which is defined in the claims appended hereto. For example, although there are definite production scheduling advantages in being able to carry out the fabrication process in two distinct steps on two distinct apparatus, as previously indicated, a barrier layer might also be formed using a filament-winding apparatus of the type shown in FIG. 1 that would employ a reservoir of a mixture of the first and second resin systems. Then, following successful inspection of the barrier layer, the same apparatus might be employed, using a second reservoir containing only the second resin system, to helically wind the major outer portion of the sidewall of the tubular pressure vessel. Although it is preferred to use the exact second resin system that is present in the barrier layer as the resin system for the second step of constructing the exterior portion of the sidewall, an equivalent resin system of the same or another manufacturer could be used, e.g. 2 thermally curable epoxy resin systems of different manufacturers might be used. Although pressure vessels are preferably wound using end closure fittings which facilitate full bore access to tubular pressure vessels of this type, it should be understood that, depending upon the particular pressure vessel design, the vessels themselves might be separately fabricated and subsequently mated with suitable end closures following the curing of the polymeric material.

The disclosure of all U.S. patents hereinbefore mentioned are incorporated herein by reference. Particular features of the invention are emphasized in the claims which follow.

What is claimed is:

1. A method of making tubular pressure vessels using polymer-impregnated fibrous material, which method comprises the steps of:

providing a cylindrical mandrel of circular cross section, forming a barrier layer upon said mandrel by rotating said mandrel about its longitudinal axis while helically applying at least one wrapping of a first fibrous material, which fibrous material is impregnated and coated with a viscous polymer material containing two resin systems which are curable in different ways, effecting the curing of one of said two resin systems in said polymer material so as to form a stable drip-free barrier layer in the form of a thin tube on said mandrel, which thin tube will constitute the interior surface region of the completed pressure vessel, inspecting said stable barrier layer for the presence of imperfections such as would require quality control rejection or substantial repair upon discovery in a completed pressure vessel, after such inspection and optional repair of said barrier layer, forming a major portion of said pressure vessel sidewall in an exterior surrounding relationship to said barrier layer by applying multiple wrappings of a second fibrous material including long fibrous reinforcing strands which are impregnated and coated with the other of said two resin systems to create a tubular lay-up of desired thickness, curing said other resin system which is present throughout the entire thickness of said tubular lay-up to create a strong, rigid, fiber-reinforced polymeric tubular pressure vessel, and removing said pressure vessel from said mandrel, whereby pressure vessels meeting ASME Section X code standards for vessels with integral fiber-reinforced resin sidewalls and having defect-free interior surfaces are efficiently manufactured.

2. The method according to claim 1 wherein said barrier layer is not greater than about 0.035 inch in thickness and wherein said polymer system is sufficiently transparent so that the surface of said mandrel can be seen therethrough allowing said inspecting step to be visually performed.

3. The method according to claim 2 wherein minor defects in said barrier layer are detected by said inspection and are eliminated by the removal of an air bubble or foreign substance, by the application of additional of said polymer material, or by the replacement of a minor localized region of said thin tube where a more extensive defect is found.

4. The method according to claim 1 wherein said first fibrous material includes nonwoven fabric of synthetic fibers.

5. The method according to claim 4 wherein said barrier layer has a wall thickness between about 0.005 in (0.13 mm) and about 0.015 in (0.38 mm) and constitutes a single helical wrapping that extends for essentially the entire length of the pressure vessel.

6. The method according to claim 1 wherein said barrier layer has a thickness between about 0.012 in (0.30 mm) and about 0.015 in (0.38 mm) and wherein ultimate pressure vessel has a sidewall thickness equal to at least about 5 times the thickness of said barrier layer.

7. The method according to claim 1 wherein said completed pressure vessel has a sidewall thickness equal to between about 2.5% and about 10% of the radius of said mandrel.

8. The method according to claim 1 wherein said one resin system is cured by radiation.

9. The method according to claim 8 wherein said curing of said one resin system in said barrier layer is effected by the application of UV radiation as said polymer-impregnated fibrous material is being helically wrapped about said mandrel.

10. The method according to claim 1 wherein said one resin system includes an acrylic resin plus a radiation-activated catalyst and wherein said polymer material has a viscosity between about 500 and about 1000 cps.

11. The method according to claim 10 wherein said other resin system includes an epoxy resin that is miscible with said one resin system.

12. The method according to claim 11 wherein said other resin system is an epoxy resin system that is curable at an elevated temperature of at least about 100° C.

13. The method according to claim 1 wherein said one resin system includes an epoxy resin plus a radiation-activated catalyst.

14. A method of making tubular pressure vessels from fibrous material and polymeric material, which method comprises the steps of:

providing a cylindrical mandrel of circular cross section at a first work station, forming a barrier layer upon said mandrel by helically applying a wrapping of fibrous material about said mandrel, which fibrous material is impregnated and coated with said polymeric material that contains two resin systems which are curable in different ways, effecting the curing of one of said two resin systems so as to form a stable drip-free barrier layer in the form of a thin tube which will constitute the interior surface region of the completed pressure vessel, inspecting said barrier layer for the presence of imperfections such as would require quality control rejection or substantial repair upon discovery in the completed pressure vessel, after such inspection and any optional repair, transferring said mandrel to a second work station and forming a major portion of said pressure vessel sidewall in an exterior surrounding relationship to said barrier layer at said second work station by applying multiple wrappings of long fibrous strands which are impregnated and coated with the other of said two resin systems to create a tubular lay-up of desired thickness on said mandrel, curing said other resin system which is present throughout the entire thickness of said tubular lay-up to create a strong, rigid, fiber-reinforced polymeric tubular pressure vessel, and removing said pressure vessel from said mandrel, whereby pressure vessels meeting ASME Section X code standards for vessels with integral fiber-reinforced resin sidewalls and having defect-free interior surfaces are efficiently manufactured.

15. The method according to claim 14 wherein, following inspection, said mandrel containing said barrier layer is installed at said second work station and said multiple wrappings are begun to be applied within a time of between about 2 hours and about 10 hours following the start of said barrier layer formation.

16. The method according to claim 15 wherein said barrier layer is formed by applying a single helical wrap of an elongated strip of said fibrous material to the mandrel, while said mandrel is being rotated, with an overlap of between about 30% and about 50% of the width of said strip.

17. The method according to claim 16 wherein said multiple wrappings of long fibrous reinforcing strands are semiautomatically applied at said second work station.

18. The method according to claim 16 wherein said barrier layer has a thickness between about 0.012 in (0.30 mm) and about 0.015 in (0.38 mm) and wherein ultimate pressure vessel has a sidewall thickness equal to at least about 5 times the thickness of said barrier layer.

19. A method of making tubular pressure vessels from fibrous material and polymeric material, which method comprises the steps of:

providing a cylindrical mandrel of circular cross section at a first work station, forming a barrier layer upon said mandrel by helically applying a wrapping of an elongated nonwoven fibrous tape about said mandrel in overlapping fashion, which fibrous tape is impregnated and coated with said polymeric material that contains two resin systems which are curable in different ways, effecting the curing of one of said two resin systems by a mechanism other than the application of heat so as to form a stable drip-free barrier layer in the form of a thin tube having a thickness between about 0.012 and about 0.015 in (0.30 and 0.138 mm) which will constitute the interior surface region of the completed pressure vessel, inspecting said barrier layer for the presence of imperfections such as would require quality control rejection or substantial repair upon discovery in the completed pressure vessel, after such inspection and any optional repair, transferring said mandrel to a second work station and forming a major portion of said pressure vessel sidewall in an exterior surrounding relationship to said barrier layer at said second work station by applying multiple wrappings of long fibrous strands which are impregnated and coated with the other of said two resin systems to create a tubular lay-up on said mandrel having a sidewall thickness at least about four times the thickness of said barrier layer, elevating the temperature of said tubular lay-up while on said mandrel to cure said other resin system which is present throughout the entire thickness of said tubular lay-up to create an integral, strong, rigid, fiber-reinforced polymeric tubular pressure vessel, and removing said pressure vessel from said mandrel.

20. The method according to claim 19 wherein said barrier layer is formed by applying a single helical wrap of said elongated fibrous tape having a thickness of not greater than about 0.007 in (0.18 mm) to the mandrel while said mandrel is being rotated, wherein the overlap is between about 30% and about 50% of the width of said strip, and wherein said pressure vessel has a sidewall thickness which is at least 5 times the thickness of said barrier layer.

* * * * *